(12) United States Patent
Shieh et al.

(10) Patent No.: US 11,080,862 B2
(45) Date of Patent: Aug. 3, 2021

(54) RELIABILITY BASED KEYFRAME SWITCHING SYSTEM AND METHOD ADAPTABLE TO ICP

(71) Applicants: NCKU Research and Development Foundation, Tainan (TW); Himax Technologies Limited, Tainan (TW)

(72) Inventors: Ming-Der Shieh, Tainan (TW); Chun-Wei Chen, Tainan (TW); Ji-Ying Li, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 74 days.

(21) Appl. No.: 16/687,126

(22) Filed: Nov. 18, 2019

(65) Prior Publication Data
US 2021/0150734 A1    May 20, 2021

(51) Int. Cl.
*G06K 9/00* (2006.01)
*G06T 7/215* (2017.01)
(Continued)

(52) U.S. Cl.
CPC ............ *G06T 7/215* (2017.01); *G06T 1/0014* (2013.01); *G06T 5/002* (2013.01); *G06T 5/40* (2013.01);
(Continued)

(58) Field of Classification Search
CPC .. G06T 7/215; G06T 7/74; G06T 7/77; G06T 7/262; G06T 7/73; G06T 7/344; G06T 7/246; G06T 7/277; G06T 7/521; G06T 7/55; G06T 7/285; G06T 7/579; G06T 7/70; G06T 17/00; G06T 17/20; G06T 1/0014; G06T 5/002; G06T 5/40; G06T 5/001; G06T 2207/10024; G06T 2207/10012; G06T 2207/10016; G06T 2207/10028; G06T 2207/20081; G06T 2207/30244; G06T 2207/20088; G06T 2207/30252; G06T 2207/30241; G06T 2207/20164; G06T 2200/04; G06T 2200/08; G06K 9/00744; G06K 9/00993; G06K 9/03; G06K 9/036; G06K 9/6211; G06K 9/00201;
(Continued)

(56) References Cited

U.S. PATENT DOCUMENTS 9,870,624 B1 * 1/2018 Narang ............... G06T 7/55
2016/0189419 A1 * 6/2016 Fakih ............... G06T 15/08
345/419

(Continued)

*Primary Examiner* — Jose L Couso
(74) *Attorney, Agent, or Firm* — Donald E. Stout; Stout, Uxa & Buyan, LLP

(57) ABSTRACT

A reliability based keyframe switching system adaptable to iterative closest point (ICP) includes a camera that captures frames; a matching device that determines corresponding pairing between the frames for an ICP operation to form a set of plural point-pairs; a transformation device that performs transformation estimation to estimate transformation that minimizes distances of the point-pairs, and determines whether the estimated transformation converges; and a reliability device that determines whether the ICP operation is reliable, and replaces a current keyframe with a new keyframe if the ICP operation is determined to be unreliable.

17 Claims, 5 Drawing Sheets

(51) Int. Cl.
*G06T 5/40* (2006.01)
*G06T 7/262* (2017.01)
*G06T 5/00* (2006.01)
*G06T 1/00* (2006.01)
*G06T 7/73* (2017.01)
*G06T 7/77* (2017.01)

(52) U.S. Cl.
CPC ............... *G06T 7/262* (2017.01); *G06T 7/74* (2017.01); *G06T 7/77* (2017.01); *G06T 2207/10012* (2013.01); *G06T 2207/10024* (2013.01)

(58) Field of Classification Search
CPC .. G06K 9/3241; G06K 9/6256; G06K 9/3233; G06K 9/00664; G01S 17/89; G01S 17/08; G01S 17/931; G01S 5/16; H04N 13/128; H04N 13/204; H04N 13/271; H04N 13/00; H04N 13/10; H04N 2013/0081; H04N 5/232; H04N 5/232933; G01C 21/32; G06N 3/08; G06N 20/00
See application file for complete search history.

(56) References Cited

U.S. PATENT DOCUMENTS

| | | | |
|---|---|---|---|
| 2017/0094245 A1* | 3/2017 | Barakat | H04N 13/204 |
| 2018/0005015 A1* | 1/2018 | Hou | G06K 9/00201 |
| 2019/0026942 A1* | 1/2019 | Zhang | G06T 7/251 |
| 2019/0130216 A1* | 5/2019 | Tomioka | G06K 9/6267 |
| 2019/0226852 A1* | 7/2019 | Xie | G01C 21/165 |
| 2019/0362157 A1* | 11/2019 | Cambias | G06K 9/6256 |
| 2020/0145588 A1* | 5/2020 | Kasuya | G06F 9/453 |
| 2020/0154085 A1* | 5/2020 | Zhou | H04N 9/3188 |
| 2020/0175311 A1* | 6/2020 | Xu | G06K 9/605 |
| 2020/0211230 A1* | 7/2020 | Zhao | G06T 9/001 |
| 2020/0349765 A1* | 11/2020 | Iwamoto | G06T 7/507 |

\* cited by examiner

RELIABILITY BASED KEYFRAME SWITCHING SYSTEM AND METHOD ADAPTABLE TO ICP

BACKGROUND OF THE INVENTION

1. Field of the Invention

The present invention generally relates to visual odometry, and more particularly to a reliability based keyframe switching method adaptable to iterative closest point (ICP).

2. Description of Related Art

Visual odometry is a process adopted in robotics and computer vision to determine position and orientation of a robot by analyzing associated camera images, for example, captured by a RGB-D camera. The motion of the robot may be estimated by aligning a source to a target RGB-D frame using an iterative closest point (ICP) method. FIG. 1 shows a block diagram illustrating a conventional visual odometry system 100 using ICP as disclosed in "Fast Visual Odometry Using Intensity-Assisted Iterative Closest Point," entitled to Shile Li et al., July 2016, IEEE ROBOTICS AND AUTOMATION LETTERS, VOL. 1, NO. 2, the disclosure of which is incorporated herein by reference.

The visual odometry system 100 is proposed to reduce computational cost, and reduce influence of outliers and noises. In the visual odometry system 100 of FIG. 1, salient point selection 11 is performed on the source frame, where points that provide valuable information for ICP are selected. The search of correspondences 12 is performed, where the matching point is determined. Weighting of corresponding pairs 13 is performed based on robust static. Incremental transformation 14 is performed to minimize the distances between the established correspondences. The above operations 11-14 are performed iteratively until the incremental transformation is smaller than a threshold or the maximum allowable iteration number has reached.

Conventional frame-to-frame alignment method inherently accumulates drift, because there is always a small error caused by sensor noise in the estimate. In order to overcome the drift problem, Christian Kerl et al. discloses "Dense Visual SLAM for RGB-D Cameras," 2013, Proc. of the Int. Conf. on Intelligent Robot Systems (IROS), the disclosure of which is incorporated herein by reference. Keyframe-based pose simultaneous localization and mapping (SLAM) method is adopted herein to limit local drift by estimating transformation between the current image and a keyframe. As long as the camera stays close enough to the keyframe, no drift is accumulated. The SLAM system needs to additionally perform keyframe selection, loop closure detection and validation, and map optimization.

A need has thus arisen to propose a novel method adaptable to ICP to overcome drawbacks of conventional schemes.

SUMMARY OF THE INVENTION

In view of the foregoing, it is an object of the embodiment of the present invention to provide a reliability based keyframe switching method for substantially enhancing performance of iterative closest point (ICP).

According to one embodiment, a reliability based keyframe switching system adaptable to iterative closest point (ICP) includes a camera, a matching device, a transformation device and a reliability device. The camera captures frames. The matching device determines corresponding pairing between the frames for an ICP operation to form a set of plural point-pairs. The transformation device performs transformation estimation to estimate transformation that minimizes distances of the point-pairs, and determines whether the estimated transformation converges. The reliability device determines whether the ICP operation is reliable, and replaces a current keyframe with a new keyframe if the ICP operation is determined to be unreliable.

DETAILED DESCRIPTION OF THE INVENTION

Figure 1:
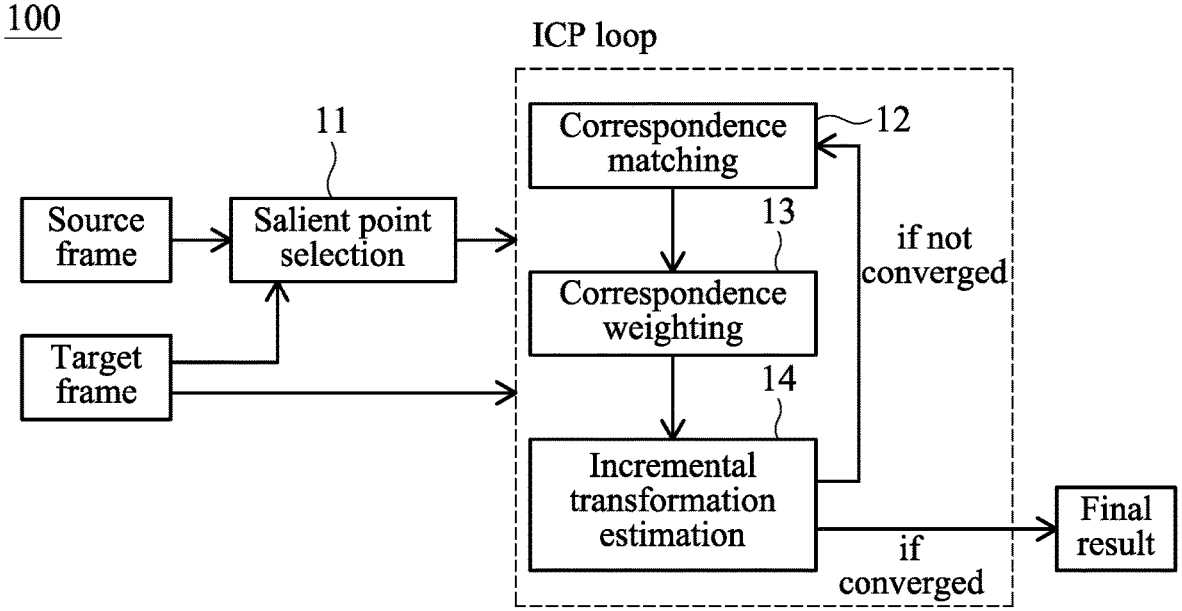
FIG. 1 shows a block diagram illustrating a conventional visual odometry system using ICP.
Figure 2A:
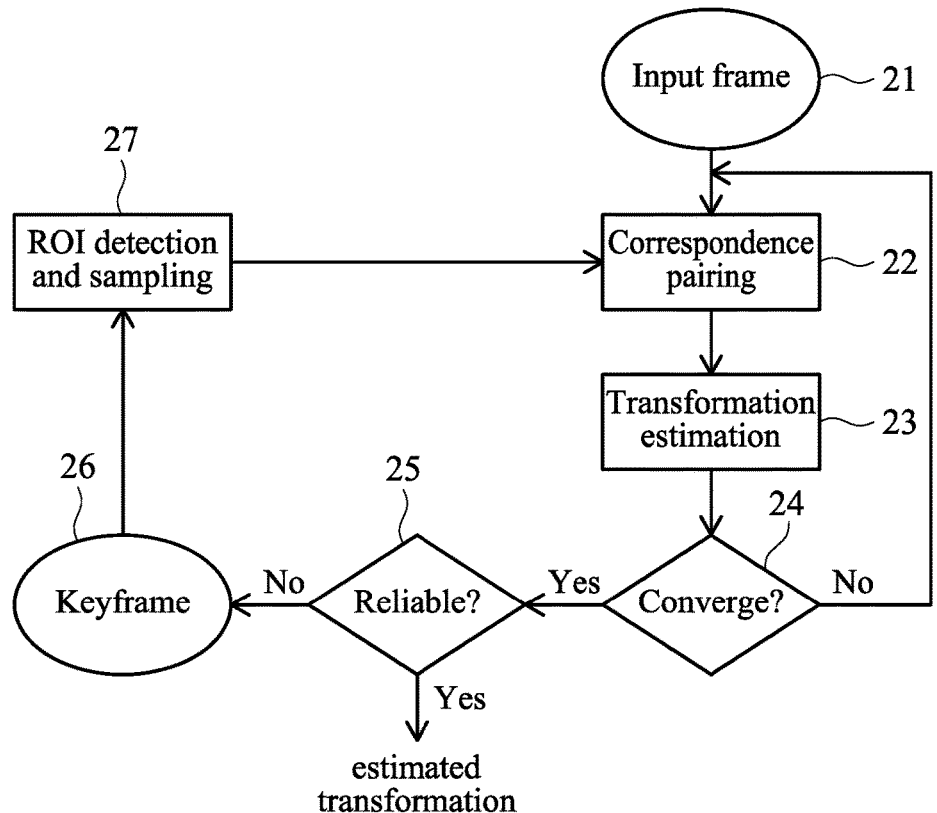
FIG. 2A shows a flow diagram illustrating a reliability based keyframe switching method adaptable to iterative closest point (ICP) according to one embodiment of the present invention.
Figure 2B:
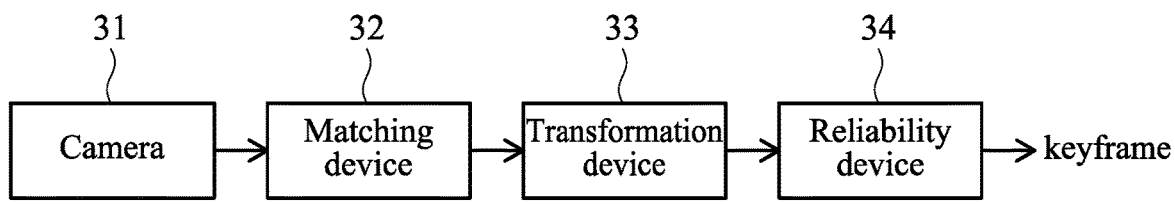
FIG. 2B shows a block diagram illustrating a reliability based keyframe switching system adaptable to iterative closest point (ICP) according to one embodiment of the present invention.

FIG. 2A shows a flow diagram illustrating a reliability based keyframe switching method 200 adaptable to iterative closest point (ICP) according to one embodiment of the present invention, and FIG. 2B shows a block diagram illustrating a reliability based keyframe switching system 300 adaptable to iterative closest point (ICP) according to one embodiment of the present invention. The steps of the reliability based keyframe switching method ("method" hereinafter) 200 and the blocks of the reliability based keyframe switching system ("system" hereinafter) 300 may be implemented by electrical circuits, computer software or their combination. For example, at least a portion of the method 200 and the system 300 may be performed in a digital image processor. In another example, at least a portion of the method 200 and the system 300 may be implemented by an instruction-controlled computer. In one exemplary embodiment, the method 200 and the system 300 may be adapted to an augmented reality (AR) device. Hardware components for the AR device may primarily include a processor (e.g., an image processor), a display (e.g., head-mounted display) and sensors (e.g., a color-depth camera such as RGB-D camera for red, green, blue plus depth). Specifically, the sensors or camera captures scenes to generate image frames (or simply frames), which are then fed to the processor that performs the operations of the method 200 and the system 300. Augmented reality is then rendered in the display.

In step 21, (image) frames captured by a camera such as a three-dimensional (3D) camera may be inputted. In the specification, a 3D camera (e.g., RGB-D camera) is a camera capable of capturing a depth (D) image in addition to a color (e.g., red (R), green (G) and blue (B)) image.

In step 22, corresponding pairing between the frames (e.g., between a current frame and a previous frame) for an ICP operation is determined by a matching device 32. Specifically, for each point on a source point set P, corresponding closest point may be found on a target point set Q, thereby forming a set of plural point-pairs $(p_i, q_i)$. Subsequently, weighting of the point-pairs may be performed.

In step 23, transformation estimation may be performed by a transformation device 33 to estimate transformation, composed of a rotation and a translation, that minimize distances of the point-pairs. In step 24, if the estimated transformation converges (e.g., the rotation and the translation are less than predetermined thresholds respectively), the flow goes to step 25. If the estimated transformation does not converge, the flow goes back to step 22. Details of ICP convergence may be referred to "Registration with the Point Cloud Library: A Modular Framework for Aligning in 3-D," entitled to Dirk Holz et al., Dec. 1, 2015, IEEE Robotics & Automation Magazine, the disclosures of which are incorporated herein by reference.

Figure 3:
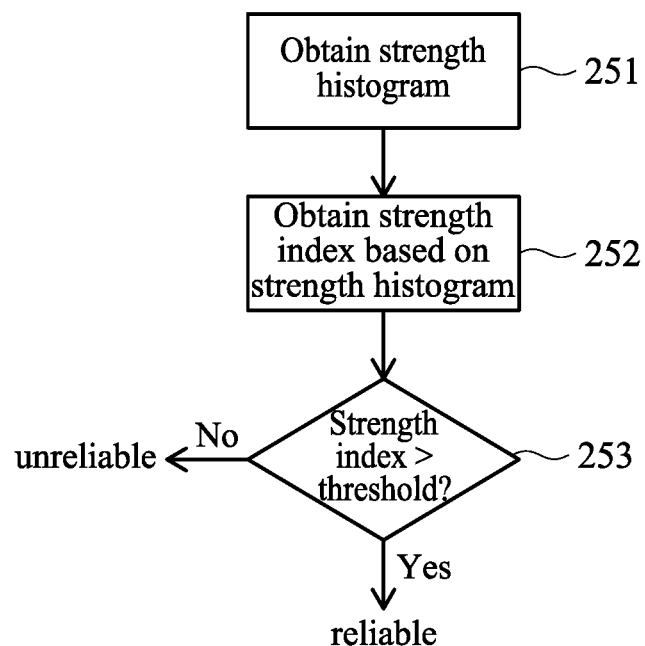
FIG. 3 shows a detailed flow diagram of step 25 of FIG. 2A.
Figure 4A:
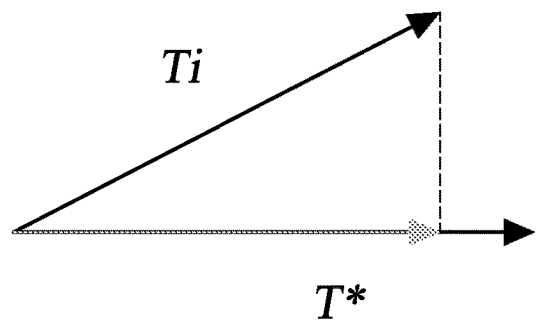
FIG. 4A shows an exemplary vector of keypoint that is projected on the direction of a frame vector.
Figure 4B:
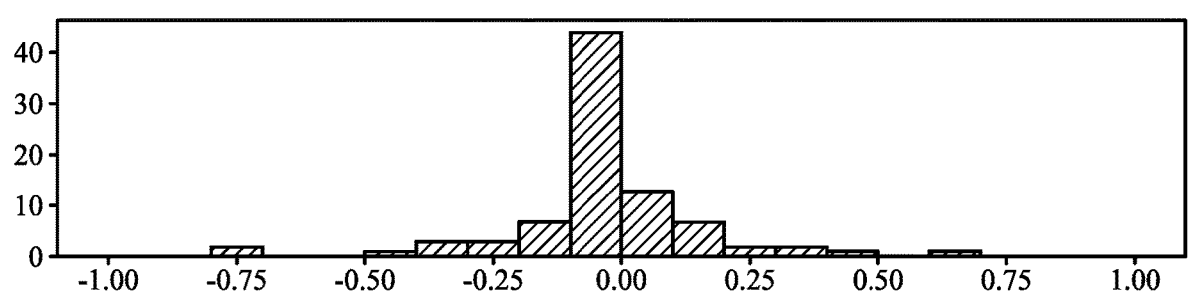
FIG. 4B shows exemplary distribution of projection in the strength histogram.

In step 25, reliability for the ICP operation may be determined by a reliability device 34. FIG. 3 shows a detailed flow diagram of step 25 of FIG. 2A. Specifically, in step 251, a strength histogram may be obtained by projecting vectors of keypoints of a (current) keyframe on a direction of a frame vector obtained from step 23, thereby obtaining projected components or strengths constructing the strength histogram, details of which may be referred to "Geometrically stable sampling for the ICP algorithm," entitled to Natasha Gelfand et al., October 2003, Fourth International Conference on 3-D Digital Imaging and Modeling, the disclosures of which are incorporated herein by reference. FIG. 4A shows an exemplary vector of keypoint Ti that is projected on the direction of a frame vector T*. FIG. 4B shows exemplary distribution of projection in the strength histogram.

In step 252, a strength index may be obtained based on the strength histogram. In one embodiment, the strength index may be an average value of the (absolute) projected components of the strength histogram. In another embodiment, the strength index may be a variance value of the projected components of the strength histogram. It is noted that the greater the strength index (e.g., average or variance value) is, the more reliable the ICP is. In step 253, if the strength index is greater than a predetermined threshold (e.g., 0.2 of the average value), a reliable state is determined, otherwise an unreliable state is determined.

Referring back to the method 200 of FIG. 2A, if the unreliable state is determined in step 25, a new keyframe (e.g., a preceding frame) is used to replace the current keyframe in step 26. Subsequently, in step 27, a region of interest (ROI) is detected and points are sampled therefrom. Next, the flow goes back to step 22 to execute another iteration of ICP operation. If the reliable state is determined in step 25, the estimated transformation (from step 23) may be outputted. Details of the ICP operation may be referred to the aforementioned "Fast Visual Odometry Using Intensity-Assisted Iterative Closest Point" and "Dense Visual SLAM for RGB-D Cameras." Further details of the ICP operation may be referred to "Multiview Registration for Large Data Sets," entitled to Kari Pulli, October 1999, Second International Conference on 3D Digital Imaging and Modeling; and "Tracking a Depth Camera: Parameter Exploration for Fast ICP," entitled to Francois Pomerleau et al., September 2011, IEEE/RSJ International Conference on Intelligent Robots and Systems, the disclosures of which are incorporated herein by reference.

Figure 5:
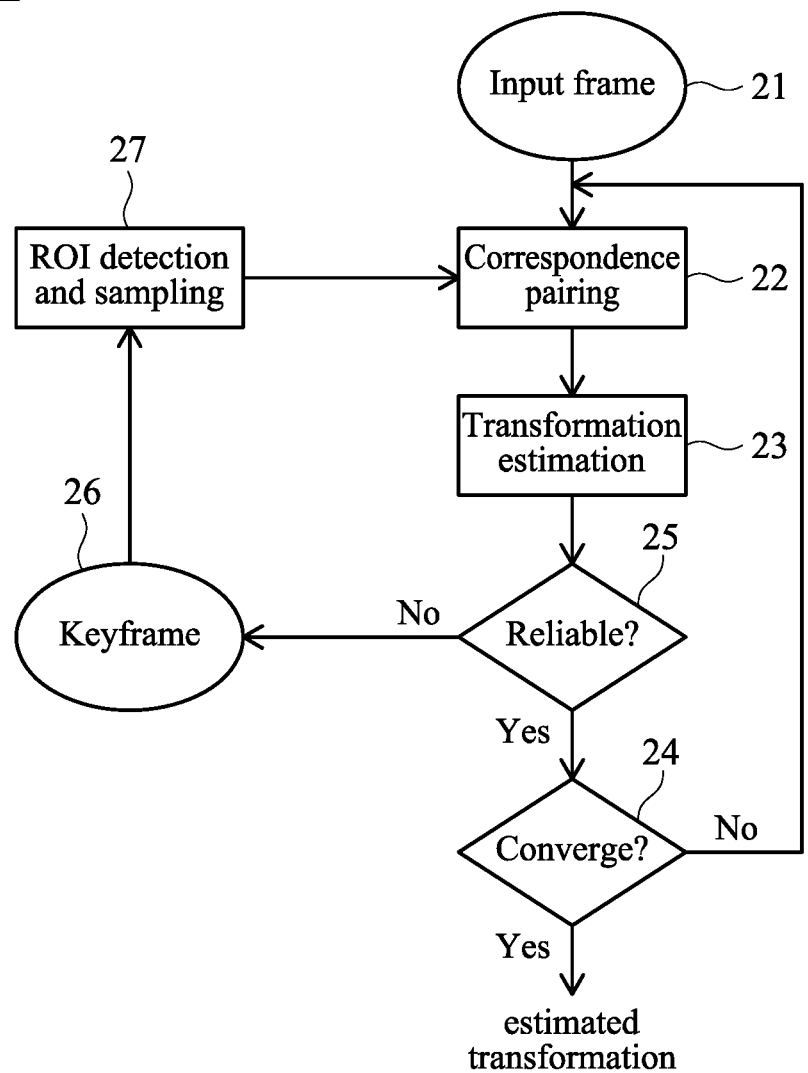
FIG. 5 shows a flow diagram illustrating a reliability based keyframe switching method adaptable to iterative closest point (ICP) according to another embodiment of the present invention.

FIG. 5 shows a flow diagram illustrating a reliability based keyframe switching method 500 adaptable to iterative closest point (ICP) according to another embodiment of the present invention. The reliability based keyframe switching method ("method" hereinafter) 500 is similar to the method 200 (FIG. 2A) except that the order of step 24 and step 25 is reversed. Specifically, after transformation is estimated in step 23, no matter the estimated transformation converges or not, the flow goes to step 25 to determine reliability for ICP. If the unreliable state is determined in step 25, a new keyframe (e.g., a preceding frame) is used to replace the current keyframe in step 26. If the reliable state is determined in step 25, the flow goes to step 24 to determine whether the estimated transformation converges. If the estimated transformation converges (e.g., the rotation and the translation are less than predetermined thresholds respectively), the estimated transformation is then outputted. If the estimated transformation does not converge, the flow goes back to step 22.

Although specific embodiments have been illustrated and described, it will be appreciated by those skilled in the art that various modifications may be made without departing from the scope of the present invention, which is intended to be limited solely by the appended claims.

What is claimed is:

1. A reliability based keyframe switching system adaptable to iterative closest point (ICP), comprising:
   a camera that captures frames;
   a matching device that determines corresponding pairing between the frames for an ICP operation to form a set of plural point-pairs;
   a transformation device that performs transformation estimation to estimate transformation that minimizes distances of the point-pairs, and determines whether the estimated transformation converges; and
   a reliability device that determines whether the ICP operation is reliable, and replaces a current keyframe with a new keyframe if the ICP operation is determined to be unreliable;
   wherein the reliability device performs the following steps to determine whether the ICP operation is reliable:
      obtaining a strength histogram by projecting vectors of keypoints of a current keyframe on a direction of a frame vector, thereby obtaining projected components constructing the strength histogram;
      obtaining a strength index based on the strength histogram; and
      if the strength index is greater than a predetermined threshold, a reliable state is determined, otherwise an unreliable state is determined.

2. The system of claim 1, wherein the matching device further performs weighting on the point-pairs.

3. The system of claim 1, wherein the transformation device determines that the estimated transformation converges when rotation and translation of the estimated transformation are less than predetermined thresholds, respectively.

4. The system of claim 1, wherein the strength index is an average value or a variance value of the projected components of the strength histogram.

5. The system of claim 1, after replacing the current keyframe with the new keyframe, the reliability device further performs the following steps:

detecting a region of interest (ROI); and
sampling points from the ROI.

6. A reliability based keyframe switching method adaptable to iterative closest point (ICP), comprising:
capturing frames;
determining corresponding pairing between the frames for an ICP operation, thereby forming a set of plural point-pairs;
performing transformation estimation to estimate transformation that minimizes distances of the point-pairs;
determining whether the estimated transformation converges;
determining whether the ICP operation is reliable if the estimated transformation converges; and
replacing a current keyframe with a new keyframe if the ICP operation is determined to be unreliable;
wherein the step of determining whether the ICP operation is reliable comprises:
obtaining a strength histogram by projecting vectors of keypoints of a current keyframe on a direction of a frame vector, thereby obtaining projected components constructing the strength histogram;
obtaining a strength index based on the strength histogram; and
if the strength index is greater than a predetermined threshold, a reliable state is determined, otherwise an unreliable state is determined.

7. The method of claim 6, wherein the frame is captured by a three-dimensional (3D) camera.

8. The method of claim 6, further comprising:
performing weighting on the point-pairs.

9. The method of claim 6, wherein the estimated transformation converges when rotation and translation of the estimated transformation are less than predetermined thresholds, respectively.

10. The method of claim 6, wherein the strength index is an average value or a variance value of the projected components of the strength histogram.

11. The method of claim 6, after replacing the current keyframe with the new keyframe, further comprising:
detecting a region of interest (ROI); and
sampling points from the ROI.

12. A reliability based keyframe switching method adaptable to iterative closest point (ICP), comprising:
capturing frames;
determining corresponding pairing between the frames for an ICP operation, thereby forming a set of plural point-pairs;
performing transformation estimation to estimate transformation that minimizes distances of the point-pairs;
determining whether the ICP operation is reliable;
determining whether the estimated transformation converges if the ICP operation is determined to be reliable; and
replacing a current keyframe with a new keyframe if the ICP operation is determined to be unreliable;
wherein the step of determining whether the ICP operation is reliable comprises:
obtaining a strength histogram by projecting vectors of keypoints of a current keyframe on a direction of a frame vector, thereby obtaining projected components constructing the strength histogram;
obtaining a strength index based on the strength histogram; and
if the strength index is greater than a predetermined threshold, a reliable state is determined, otherwise an unreliable state is determined.

13. The method of claim 12, wherein the frame is captured by a three-dimensional (3D) camera.

14. The method of claim 12, further comprising:
performing weighting on the point-pairs.

15. The method of claim 12, wherein the estimated transformation converges when rotation and translation of the estimated transformation are less than predetermined thresholds, respectively.

16. The method of claim 12, wherein the strength index is an average value or a variance value of the projected components of the strength histogram.

17. The method of claim 12, after replacing the current keyframe with the new keyframe, further comprising:
detecting a region of interest (ROI); and
sampling points from the ROI.

* * * * *